United States Patent [19]
Gottesman et al.

[11] Patent Number: 6,049,782
[45] Date of Patent: Apr. 11, 2000

[54] RELATIONSHIP MANAGEMENT SYSTEM AND PROCESS FOR PRICING FINANCIAL INSTRUMENTS BASED ON A CUSTOMER'S RELATIONSHIP WITH A FINANCIAL INSTITUTION

[75] Inventors: Sidney Gottesman, Flushing, N.Y.; Darlene Shuman, Princeton, N.J.; Patricia Eletto, Brooklyn, N.Y.; Ben Gurdus, Westfield, N.J.; Bob Santariello, Brooklyn, N.Y.; Jay Murthy, East Meadow, N.Y.; Michael Spivak, Jericho, N.Y.

[73] Assignee: Citibank, N.A., New York, N.Y.

[21] Appl. No.: 08/655,924

[22] Filed: May 31, 1996

[51] Int. Cl.$^7$ ............................. G06G 7/52; G06F 17/60; G06F 17/30; G06F 19/00
[52] U.S. Cl. ............................... 705/35; 705/36; 705/38; 705/39; 705/40; 705/42
[58] Field of Search ................................. 705/35, 36, 40, 705/38, 39, 42

[56] References Cited

U.S. PATENT DOCUMENTS

| | | |
|---|---|---|
| 3,017,103 | 1/1962 | Goldberg et al. .......................... 705/35 |
| 4,742,457 | 5/1988 | Leon et al. ............................... 364/408 |
| 5,557,798 | 9/1996 | Skeen et al. ............................... 705/35 |
| 5,644,727 | 7/1997 | Atkins ....................................... 705/40 |
| 5,649,116 | 7/1997 | McCoy et al. ............................. 705/38 |
| 5,649,181 | 7/1997 | French et al. ............................... 707/3 |
| 5,659,165 | 8/1997 | Jennings et al. ......................... 235/379 |
| 5,710,889 | 1/1998 | Clark et al. .......................... 235/379 X |
| 5,819,263 | 10/1998 | Bromley et al. ............................ 707/3 |
| 5,832,461 | 11/1998 | Leon et al. ................................ 705/38 |

FOREIGN PATENT DOCUMENTS

WO 97/45803  12/1997  WIPO .

OTHER PUBLICATIONS

Calvey, Mark, "New BofA Exec Aims to Take Customers to Front of Line", San Francisco Business Times, vol. 12, (Nov. 28, 1997), pp. 7A (2 pages).

Zack, Jeffrey, "As Call Centers Become Profit Centers, Will They Make Banks Seem Too Remote?", American Banker, vol. 161, No. 148 (Aug. 5, 1996), p. 4A.

Kolor, Joanna, "Following the Money", Bank Technology News, (Oct. 1, 1996), 7 pages, (Discusses patented relationship product "Home Account").

Bottorff, Dennis C., "Will Banking Hear Its Wake–Up Call?", Bank Business News, (Dec. 1994), pp. 1–5.

Berry, Leonard L. and Manjit S. Yadev, "Capture and Communicate Value in the Pricing of Services", Sloan Management Review, vol. 37, No. 4 (Summer 1996), pp. 41–51.

"Home Banking Avalance", ABA Banking Journal, vol. 87, No. 10 (Oct. 1995), pp. 125–127.

Holliday, Karen Kahler, "The New Marketing Paradigm", US Banker, vol. 106, No. 3 (Mar. 1996), pp. 71–72.

Persing, Linda L., "Packaging Fine Tunes Marketing Programs", Computers in Banking, vol. 6, No. 9 (Sep. 1989), pp. 21–24.

(List continued on next page.)

Primary Examiner—Eric W. Stamber
Assistant Examiner—Pedro R. Kanof
Attorney, Agent, or Firm—George T. Marcou; Kilpatrick Stockton LLP

[57] ABSTRACT

A system and process for use by a financial institution to facilitate relationship pricing in connection with a single account that includes a plurality of account components, including a checking component, a savings component and a investment component. The system includes software engines operated on specially programmed general purpose computers. The engines are sub-systems that generate input and drive another sub-system or the product processors. The overall function of the engines is to, among other things, allow pricing to be determined based on a customer's total individual or household relationship to the financial institution. The preferred system includes a rate engine, a pricing engine, a linkage engine, a balance engine, and a cycle engine.

24 Claims, 11 Drawing Sheets

OTHER PUBLICATIONS

Ferrari, Richard H., "Commercial Loan Pricing and Profitability Analysis, Part II", The Journal of Commercial Lending, (Mar. 1992), pp. 35–46.

"Marketing Minutes", (Orlando, Florida article referring to Sun Banks Inc.'s move toward relationship pricing), Bank Advertising News, vol. 16, No. 3 (Sep. 23, 1991), p. 8.

"CoreStates Hikes Loan Discounts", Bank Rate Monitor, vol. 9, No. 2 (Dec. 24, 1990), pp. 1, 8.

Knilans, Gerri, "Database Marketing: Fad, Fantasy or Reality?", Direct Marketing, vol. 60 (May 1997), pp. 48–51.

Internet, Avoid Monthly Charges and Get a Whole Lot More, Crestar. http:/www.crestar,com/checking/key acct.stm, Nov. 3, 1998.

Mayor VA. Bank Launches Package, in Data Rate Monitor, v7, n37, p1, Aug. 28, 1989.

Crestar Package Obtains Half of New Accounts, Bank Rate Monitor, v9, n22, p3, May 31, 1991.

Crestar revamps Key, Lets Customers Choose, Bank Advertising News, p2, Jan. 1, 1993.

"Marketing minutes . . . Crestar breaks middle–market package", Bank Advertising News, v14, n1, p1, Sep. 11, 1998.

"Computer dictionary", Microsoft Press, 3th. edition, 1997.

Sullivan, Michael P.; "Financial Marketing Issues Rate High on Effort, Low on Delivery"; American Banker; Jul. 29, 1987; v152 n147; p. 4.

Chmura, Christine; "A Loan Pricing Case Study"; Journal of Commercial Lending; Dec. 1995; v78 n4; p23–33.

FIG. 11

RELATIONSHIP PRICING LOGIC TABLE FORM

FOR FIMP:____ PLAN:____ PREPARED BY:    EFFECTIVE:__/__/__ PAGE__OF__

ENTRY NUMB.

| LINE | FLD 1 | OPR | FLD 2 | SKIP |
|------|-------|-----|-------|------|
| 01 | | | | |
| 02 | | | | |
| 03 | | | | |
| 04 | | | | |
| 05 | | | | |
| 06 | | | | |
| 07 | | | | |
| 08 | | | | |
| 09 | | | | |
| 10 | | | | |
| 11 | | | | |
| 12 | | | | |
| 13 | | | | |
| 14 | | | | |
| 15 | | | | |

ENTRY NUMB.

| LINE | FLD 1 | OPR | FLD 2 | SKIP |
|------|-------|-----|-------|------|
| 01 | | | | |
| 02 | | | | |
| 03 | | | | |
| 04 | | | | |
| 05 | | | | |
| 06 | | | | |
| 07 | | | | |
| 08 | | | | |
| 09 | | | | |
| 10 | | | | |
| 11 | | | | |
| 12 | | | | |
| 13 | | | | |
| 14 | | | | |
| 15 | | | | |

VALID OPERATIONS:

| | |
|---|---|
| : | ASSIGNMENT |
| + | ADD FLD 2 TO FLD 1 |
| - | SUBTRCT FLD 2 FROM FLD 1 |
| * | MULTIPLY FLD 1 BY FLD 2 |
| / | DIVIDE FLD 1 BY FLD 2 |
| S | SET INDICATOR |
| R | RESET INDICATOR |
| J | JUMP TO LINE / ENTRY |
| = | JUMP IF FLD 1 = FLD 2 |
| # | JMP IF FLD 1 NOT = FLD 2 |
| > | JUMP IF FLD 1 > FLD 2 |
| < | JUMP IF FLD 1 < FLD 2 |
| Z | JUMP IF FLD 1 IS ZERO |
| P | JUMP IF FLD 1 IS POSITIVE / SET |
| N | JUMP IF FLD 1 IS NEGATIVE / SET |
| @ | PERFORM SUB-PLAN |
| ? | NO-OP |

VALID INPUT FIELD TYPES:
B01 - B15 BALANCE FIELDS
E01 - E15 MONTH-END BALANCES
U01 - U20 USAGE COUNTERS

VALID OUTPUT FIELD TYPES:
H01 - H20 TOTAL USAGE UNITS
F01 - F20 FREE UNITS
G01 - G20 CHARGE PER UNIT
T01 - T20 TOTAL CHARGE
V01 - V20 TIER VALUE
M01 - M20 MISC. FIELD

VALID WORK FIELDS:
W01 - W30 GENERIC WORK FIELDS
I01 - I20 MISC. FIELD

CONSTANTS:
CA0 THROUGH CZ9
INDEX (G.P. SUBSCRIPT)
XXX

NOTES

JUMP OPERATIONS:
Nxx    TO ENTRY xx
Lxx    TO LINE xx
EXIT IF xx - 99
P Inn - JUMP IF Inn SET
Z Inn - JUMP IF Inn RESET

@ ppp - SUBR. PLAN ppp

FOR DIVISION, FLD 1
WILL BE ZERO IF
FLD 2 = 0

RELATIONSHIP MANAGEMENT SYSTEM AND PROCESS FOR PRICING FINANCIAL INSTRUMENTS BASED ON A CUSTOMER'S RELATIONSHIP WITH A FINANCIAL INSTITUTION

NOTICE OF COPYRIGHTED MATERIAL IN DISCLOSURE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to a relationship management system and process for allowing a bank or other financial institution to price the charges to maintain accounts with the bank and to set the rate of interest to be earned by or charged to a customer based on a broad view of the customer's relationship with the bank or financial institution.

BACKGROUND OF THE INVENTION

The present invention broadly relates to the way banking institutions price the charges to maintain accounts with the bank. For example, a customer having a checking account is typically assessed a charge, determined by formula, to maintain the account. For example, if the customer has a checking account that doesn't earn any interest, then the charge might be $5 per month unless the customer maintains a certain minimum average daily balance over the period, in which case the bank will waive the charge. As an option, the customer might be offered a checking account that earns interest with a monthly charge of $8 per month. Again, the monthly charge might be waived if the customer maintains a certain average daily balance in the checking account for the duration of the month.

The present invention also relates to the way banking institutions set rates of interest to be earned by or charged to a customer. Traditionally rates earned are set for each type of account. Thus, for example, if the customer selects a certain type of checking account, the interest in the checking account is going to be 3% (per annum) of the customer's average daily balance.

In recent years, financial institutions have begun to offer a broader range of traditional banking accounts as well as investment and financial services. The traditional marketing approach of banks has been to try to enroll customers in new accounts, typically checking or savings accounts. Then, when the bank offers additional financial products or services, the bank tries to cross sell new accounts to customers having existing accounts with the bank.

This traditional marketing approach is not always effective because financial service is very much an inertia business. Once a customer opens an account, he or she is unlikely to change that account because of the effort involved. Most people don't shop for financial services. Instead, something in a customer's life occurs to cause a customer to make a change or be open to a change. There are moments in life when inertia is overcome; either by moving, death, formation of a family, a customer gets so angry at something that the customer decides to make a change, or some other event occurs. Thus, at the moment a customer opens an account they are open to new components, but it is difficult to open a customer up again. For this reason, cross selling financial services is very difficult. Once a person has a set of accounts, then something's got to happen in their life to cause them to open up another account.

To overcome these obstacles, the focus of the present invention is to build a relationship with the customer rather than opening stand alone accounts for the customer. Studies have shown that as a customer's relationship with a bank broadens, the customer's balances increase. The concept of "relationship pricing" is one way of establishing a long term relationship with a customer. More specifically, financial institutions, especially banks, have recognized that the traditional way of setting monthly charges and interest rates is not entirely satisfactory to customers. Customers do not want to be charged based on an account level. Instead customers prefer to be charged based on the customer's whole portfolio. In theory, this includes at least the amounts the customer has in the customer's checking account, the customer's savings account, the customer's CDs, and the customer's mortgage with the bank. Thus, the notion of "relationship pricing" has recently come into vogue in the banking field.

An article in the Journal of Commerce Lending dated March 1992 titled "Commercial Loan Pricing and Profitability Analys Part II", includes a detailed discussion of the concept of relationship pricing. The article is basically an economic analysis of various commercial loan pricing practices, but discusses relationship pricing in some detail.

An article in the Sep. 23, 1991 issue of "Bank Advertising News", titled "First Union sets strategy after Southeast buy," describes First Union Corp's "move toward relationship pricing." The article does not go into any great detail regarding the specific systems employed.

An article in the Dec. 24, 1990, issue of "Bank Rate Monitor", titled "Corestateshikes loan discounts," discusses Core-States Financial Corps's "new relationship package in all markets." Again, the article simply describes the concept of relationship pricing, but not the systems for implementing the same.

There have been attempts to provide linked account structures in the past. The Citicard account, introduced in 1976 and 1977, was the first account that allowed four or five accounts to be mechanically linked together. A simple transactional account, short term savings, day-to-day savings, and 90-day savings, checking and checking plus line of credit were all linked in the Citicard account. Over the next ten years, other banks copied this approach and began offering "linked accounts," which are essentially transactional banking accounts with some saving components and perhaps a line of credit—a very traditional banking product.

Previous systems implemented pricing schemes that combine at the account to account level, e.g., a checking account and a savings account are linked. These systems have been designed to link (by pointers) other accounts so that, for example, the customer's savings balance is considered in determining a charge for the checking account or the customer's tax deferred money in the customer's 401k could point to the checking account. This was done solely for the purposes of setting the point at which the customer no longer got charged a monthly service fee. Thus, known systems might allow a bank to charge $5 per month for an interest checking account unless the average balance in the customer's checking account was $2,500 or the customer's combined checking and savings account balances averaged $5,000 or the customer's combined checking, savings and 401k investments averaged $10,000 per month.

These known systems were, however, limited to account to account relationship links. As a result, known systems do not incorporate the full individual customer relationship, nor do they recognize the total full household relationship, including, for example, the customer's checking, the customer's savings, the customer's spouse's checking, the customer's spouse's savings, the customer's dependents' checking, the customer's parents' checking, savings and pension.

Current systems and processes for relationship pricing are not entirely satisfactory, however. Known systems and processes do not allow the bank to consider a customers entire relationship with the bank. To fully implement relationship pricing, a bank must truly understand the relationship of a customer to the bank.

SUMMARY OF THE INVENTION

The present inventor's have recognized that a customer's relationship with a bank has at least two dimensions. The first dimension is the customer's individual set of instruments with the bank. The fees and rates for these instruments have previously been priced and interest rates set individually. So the customer checking account got priced, the customer mortgage got priced, the customer credit card was priced. True relationship pricing requires that a bank set the charges and the rates based on all of the customer's individual instruments in order to recognize the first dimension of the customer's relationship with the bank.

The second dimension of the customer's relationship with the bank is the "household." This involves recognizing not just the customer's instruments alone, but also considering instruments owned by the customer's spouse, or the customer's children, or a dependent parent who is living with the customer.

Thus, one object of the present invention is to provide a relationship management system and process that enables a bank to fully consider both dimensions of a customer's relationship with a bank in setting prices and rates. The system and process should allow multiple individuals to share their balances for purposes of setting charges and setting the rates.

Another object of the present invention is to provide a relationship management system and process that allows a bank to set prices and rates based upon a true understanding of a customer's relationship with the bank.

Another object of the invention is to provide a data model that reflects the structure of a customer's relationship to the bank and the customer's profit and services that are they had tied in with the bank to allow the bank to consider, for example, total household balance to determine whether to charge the customer a monthly fee and to give the customer additional interest based on the level of investment or the amount of money the customer has with the bank. Correspondingly, the bank may also charge less interest on certain forms of loans based on the household balance. This allows the bank to create an incentive for the customer to build a strong relationship with the bank. For example, a wealthy individual can benefit his relatives by investing through the bank.

The pricing system of the present invention is preferably used in conjunction with a system and method for standardizing household information from internal sources into a centralized database of a financial institution to allow the institution to better understand each customer's relationship with the institution. By contrast, in currently available systems, the links are done account to account. So in processing the savings account file, the savings account has got a pointer that points to the checking account. It can only point to one point and the savings account wouldn't know what else is linked to the checking account. A file is typically maintained that is a summary file of all the account to account links.

In large scale applications, the system should interface with a system that efficiently assembles and retrieves information from a centralized database(s) containing a high volume of financial and demographic data to allow the institution to better understand each customer's relationship with the institution. For example, an embodiment of the present invention includes a global communications network that accesses the customer information and makes the information accessible at all customer service delivery points, including branches and service centers. The currently preferred relationship management system includes a comprehensive central database (Global Customer Integration Facility—GCIF) maintained on a minicomputer and assembled from diverse sources and means for retrieving the information from the central database in a meaningful and practical way. In more detail, the system accesses both traditional customer demographic information, such as name, account number, and other identifiers in addition to other demographic information, such as legal ownership, statement packaging, and households. In short, a traditional summary file of all the account to account links of the existing art is replaced with a sophisticated system for storing information that allows the bank to determine relationships between accounts, i.e., what makes up the household. Rather than treating accounts, such as a customer's checking account, individually, the accounts are treated as components of a single account. All components that appear on a single statement are now called a package. A package is a collection of all components, and the collection of packages creates the household. The system of the present invention maintains—the data representation that identifies which components are in which packages and which packages form a household.

The system of the present invention includes dedicated systems or "engines" for performing certain tasks for all components of an account. The relationship management system includes a system, for example, that does nothing but accumulate balances referred to as a balance engine. The relationship management system also includes a pricing engine that calculates the interest rate to charge or to earn based on the accumulated balance system according to a specified tier model. The pricing system or engine performs this function for all account components. Thus, for example, when a checking system wants to know how much interest should be credited to a particular customer, it calls the pricing engine. The relationship management system also includes a "cycling engine," i.e., a system that tells some of the participating systems when they should hand off to the statement system that actually produce the statements. To create a package, all of the components have to appear on a statement together. The "cycling engine" sends a message to each component system requesting information needed for the customer's statement. The Rate Engine, the Pricing Engine, the Linkage Engine, the Balance Engine, the Cycle Engine, and the Relationship Pricing/Balance Database all preferably reside on a Mainframe computer.

Thus, the present invention provides a relationship management system for pricing a customer's financial instruments in an integrated financial system of the type in which a single "account" includes a plurality of account components, including at least a checking component, a savings component and a investment component, to be priced based on a customer's total individual relationship to the financial institution. The system includes one or more general purpose programmable computers, preferably commercially available mainframe computers or minicomputers such as those manufactured by DEC and microcomputer workstations. The system further includes means for centralizing the capture, storage and access to the interest rates for the components to be priced; means for generating a database of component relationships; means for generating relationship balance files; means for determining the pricing of individual components, in terms of fees and premium/discount rates applicable for the component at the time of component opening and statement cycling based on the customer's total individual relationship to the financial institution using the database of component relationships and balances; and means for displaying the pricing for each component.

The relationship management system may also include means for determining a list of components cycling on a given day and generating driver files to the product processors for statements. The relationship management system determining thee means for determining the pricing of individual components in terms of fees and premium/discount rates applicable for the component at the time of component opening and statement cycling based on the customer's total household relationship to the financial institution, including balances of relatives.

Thus, the present invention provides a relationship management process for pricing a customer's financial instruments in an integrated financial system of the type in which a single "account" includes a plurality of account components, including at least a checking component, a savings component and an investment component, to be priced based on a customer's total household relationship to the financial institution. The process includes the steps of: centralizing the capture, storage and access to the interest rates for the components to be priced; generating a database of component relationships; generating relationship balance files using the database of component relationships; determining the pricing of individual components in terms of fees and premium/discount rates applicable for the component at the time of component opening and statement cycling based on the customer's total household relationship to the financial institution; and displaying the pricing for each component. The process may further include the steps of: determining a list of components cycling on a given day; generating driver files to the product processors for statements; and determining the pricing of individual components in terms of fees and premium/discount rates applicable for the component at the time of component opening and statement cycling based on the customer's total household relationship to the financial institution including balances of relatives.

BRIEF DESCRIPTION OF THE DRAWINGS

The currently preferred embodiment of the present invention will now be described in conjunction with the attached drawings in which:

FIG. 11 shows the form that will be used to code the Pricing rules used in the system and process of the present invention.

DETAILED DESCRIPTION

The existing account structure requires a significant amount of effort on the part of the customer and the bank staff to consolidate: linking, visiting with various staff members, etc. For simplification and ease of use, the relationship management system (RMS) performs the following functions provides a new relationship account structure with all liability product components; revises the account opening process/screen flow to be easier and faster; implements a Global Customer Integration Facility (GCIF) to enable a true relationship management environment; converts existing customers to the new structure; and introduces new branch open architecture which is faster, more flexible and integrated with the GCIF. The objectives of modifying the pricing structure are to perform the following establish a simplified structure for accounts by changing to a relationship approach, as opposed to the current component/account approach; provide an economic reason for customers to open an account with better return on money in the form of better rates and fees; integrate pricing across many units of the bank, since customers perceive one provider, not many; and strengthen clarity of relationship pricing benefits.

Currently, the pricing structure uses only the balances in deposit products and investments to determine if they meet the required level to result in reduced or eliminated service charges and transaction fees. For the RMS, the customer's entire relationship as defined by the customer is looked at to determine the relationship/household balances for determining the following if a service charge will be assessed; if a deposit account will receive a preferred (premium) rate; and, if a loan account will receive a preferred (discounted) rate. The types of accounts that will be available to "count" for total relationship/household balances will include: liability and investment products, such as deposits, checking, savings, CDs, IRA and Keoghs, and annuities; and asset products, such as unsecured line checking, preferred line credit, secured ready credit, preferred loan, fixed rate home equity loan, installment loan, first mortgage, bankcards, CD loan, secured non-purpose loan, margin loan, and tailored loan, etc.

Figure 1:
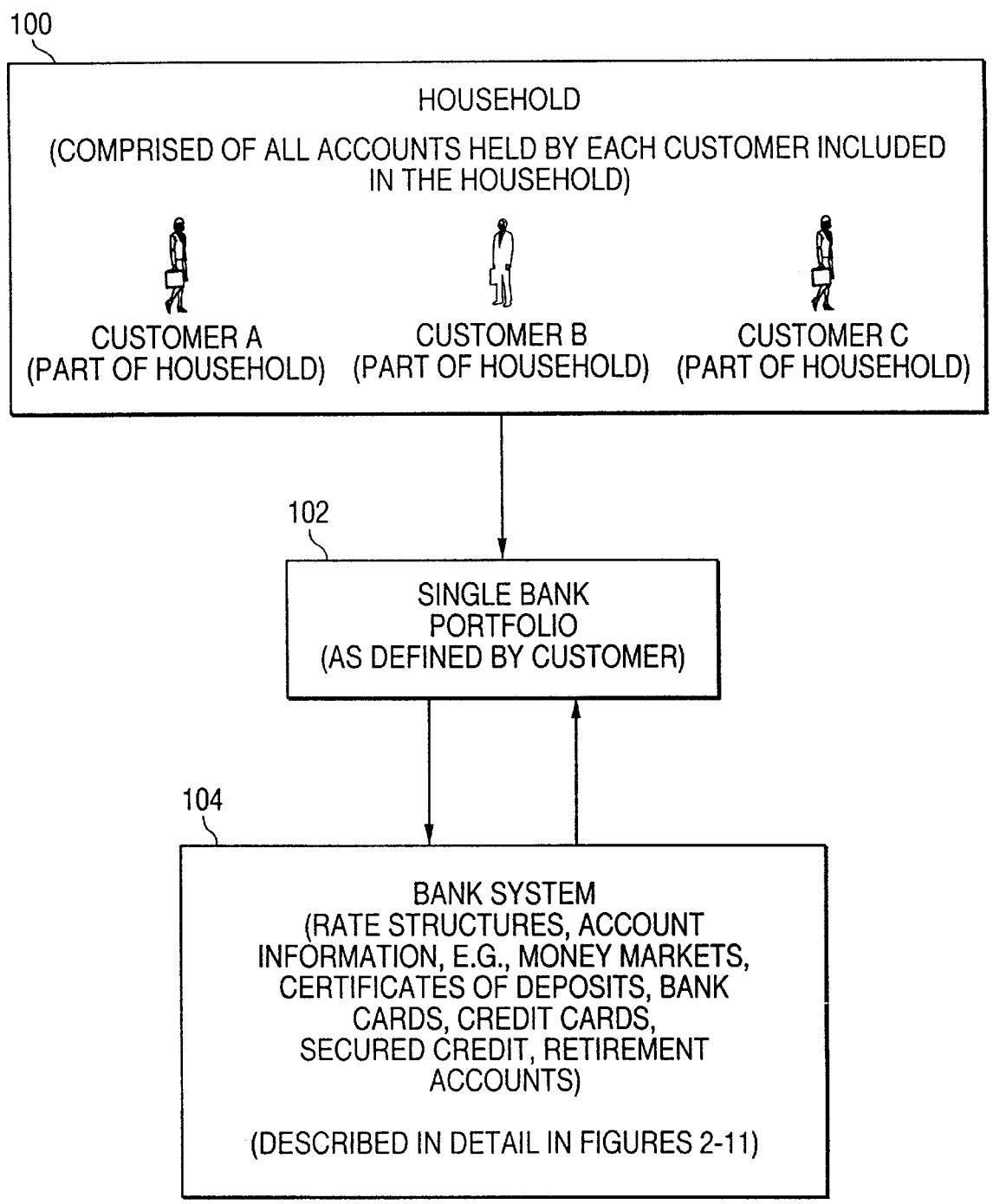
FIG. 1 is a high level overview of the environment of the system of the present invention.

In FIG. 1, the household 100 is comprised of all accounts held by each customer included in the household and integrates into a single bank portfolio 102 which is defined by the customer. This portfolio forms the basis for the interaction with the bank system 104, which defines the rate structures and account information for all types of accounts, such as money market, certificates of deposit, credit, and bank cards.

The Relationship Management System 104, as shown in FIG. 1, of the present invention is implemented in the form of several software Engines operated on specially programmed general purpose computers. An Engine is a sub-system of the RMS of the present invention that generates input and drives another sub-system or the product processors. The overall function of the RMS is to implement the present invention of relationship pricing and statement requirements. The RMS of the present invention consists of the Rate Engine, which centralizes the capture, storage and access to the interest rates for the relationship priced products; the Pricing Engine, which determines the pricing of individual components in terms of fees and premium/discount rates applicable for the component at the time of component opening and statement cycling; the Linkage Engine, which maintains a database of component relationships for Statement, Pricing and Safety Check/Checks as Cash processing; the Balance Engine, which establishes the household relationship balance files for the Pricing; and the Cycle Engine, which determines the list of components cycling on a given day and generates driver files to the product processors for statements.

The Rate Engine supports maintenance to the Rate Database, a centralized repository for base rates for all products, and service requests for product base rates. It supports download requests for other systems within the bank such as an account opening system. Requests for generic base rates are serviced by the Rate Engine directly, and requests for Personalized Relationship bases rates are serviced via the Pricing Engine. The Rate Engine consists of the access, entry and the maintenance of the Rates, Spreads and various pricing data. The purpose of the system is to centralize data storage and capture. The front-end system for data capture is implemented with Graphical User Interface screens on the work stations. The front-end system will have two components, a Data Management/Access and Security component and a Data Presentation/Edit component, which function within a Windows™ operating environment. The Rate Engine will provide base rate and APY (calculated) for a given product, provide base rates for a given class of products, and provide base rates for all products and support promotional base rates.

The Pricing Engine services all requests for relationship specific pricing data (i.e. household balance, tier, Specific Product rate based on household balances, special pricing). It is invoked at account activation, account opening, statement cycling/pricing, or to support tier/pricing rules maintenance. The Pricing Engine provides household balance historic information given a component, account or household number, and provides interface to the Rate Database for current base rate information. The Pricing Engine consists of a series of modules. The function of the modules is to assess the monthly service charges, compute end of month footings and determine the premium/discount rates for the components. The Pricing Engine is designed with most of the pricing rules (logic) and the parameters (data) maintained in tables. The pricing engine provides table-driven functions. Products can be divided into several sub-products for pricing purposes. For example, separate pricing rules can be established for Checking product held by students and seniors. Up to 15 end of month footings can be computed for each of the products. The products that can contribute for pricing and their individual weightings can be set up at the recipient product level. Transaction pricing can be established for various types of transactions such as checks, direct deposit, teller, or bill payment, etc. The mathematical rules for determining transaction fees are in the tables. The interest rate tables hold rates for up to 15 tiers. The tier for a given component is determined using the rules in the table for the product that the component belongs to. The rules use the footings, current balance, average cycle balance, credit line, points paid, origination and application fees as input. The auto deduct and closing costs paid indicators are also passed as input. The interest rates and all the pricing parameters are in tables that are user maintainable. The rate engine will implement the on-line system for maintaining these tables. Pricing changes can be made to new customers without impacting the existing customers.

A new language has been developed to express the business rules for Relationship Pricing. The language allows computation using the Customer variables such as Balances and Transactional activities and Business variables such as Balance thresholds and fees. The language supports control structures such as Call statement, If Statement and GOTO statement. A syntax checker and an Interpreter have been developed to implement the language. Two versions of the Interpreter have been developed, one in IBM COBOL II to be used by the Pricing interfaces in the back office systems and the second one in Microsoft C for use in the Front end account opening system (OSRO). The rules are stored in tables and used by the Interpreter at Component Opening, Activation and at the time of Statementing/Billing. The tables and the Interpreter ensure consistent application of the Business rules at all access points. FIG. 11 shows the form that will be used to code the Pricing rules.

The Linkage Engine is a batch process to update the relationship structure for balance aggregation and pricing data availability. The Linkage Engine will receive and process a delta hand-off from GCIF daily; update the component detail file for additions, modifications, and deletions; update the statement package file for statement additions, modifications, and deletions; update the component link file for all component and package additions and deletions; update the Safety Check/Checks-as-Cash file with changes; create a hand-off to mortgage and bankcards; create a hand-off to the Deposit System for all changes to cycle code, rule-off code, bounce protection code, date of birth, safety checks and checks-as-cash fields. Linkage Management will be insulated from statement and pricing component packaging. The validation for including components in a package will be done by the GCIF Database. A component can never contribute to more than one statement package and one pricing package.

The GCIF Database is assembled from diverse sources and means for retrieving the information from the central database in a meaningful and practical way. The GCIF Database is preferably maintained on a DEC minicomputer or similar programmable computer. The system accesses both traditional customer demographic information, such as name, account number, and other identifiers in addition to other demographic information such as legal ownership, statement packaging, and liability and asset pricing. The demographic information is maintained in repositories that support pending transactions as well as coordination of account information. Thus, the GCIF Database is a sophisticated system for storing information that allows the bank to determine relationships between accounts, i.e., what makes up the household. Rather than treating accounts, such as a customer's checking account, individually the accounts are treated as components of a single account. All components that appear on a single statement are now called a package. A package is a collection of all components and the collection of packages creates the household. The system of the present invention maintains the data—the data representation that identifies which components are in which packages and which packages form a household.

The Balance Engine accumulates balances from the product processors and maintains balances on the Relationship Pricing/Balance Database. Component balances maintained are current, aggregate month-to-date and prior calendar month averages. For the household accounts, prior calendar month balances are maintained. The Balance Engine will update the balance for each product component daily with feeds from the product processors; aggregate balances on a month-to-date basis; roll-up balances at month end to the package level; maintain and provide historic balance information to service providers and customer service outlets; update the component detail file with data from the balance feed from each of the posting systems.

The Cycle Engine performs a daily scan of the accounts in the Relationship Pricing Database to determine the day's rule-offs. Resultant component files are created with pricing data (rates, tiers, Household balances, waivers, etc.) obtained via the Pricing Engine to drive posting system cycling. The Cycle Engine will build a file of components for each posting system to drive cycling; invoke the Pricing Engine to obtain all necessary relationship pricing data; update the Relationship Pricing/Balance Database with last statement cycled data on the component level; produce Statement Driver files for statement links to be used for either products appearing as Summary of Balances line items, or a driver to obtain product detail from the product processor master files.

The Rate Engine, the Pricing Engine, the Linkage Engine, the Balance Engine, the Cycle Engine, and the Relationship Pricing/Balance Database all reside on a Mainframe computer. The GCIF system and the daily Tiers and Rates Tables resides on a DEC mini-computer. Interaction to the system is done from a Windows-based personal computer or an customer activated terminal (CAT).

Figure 2:
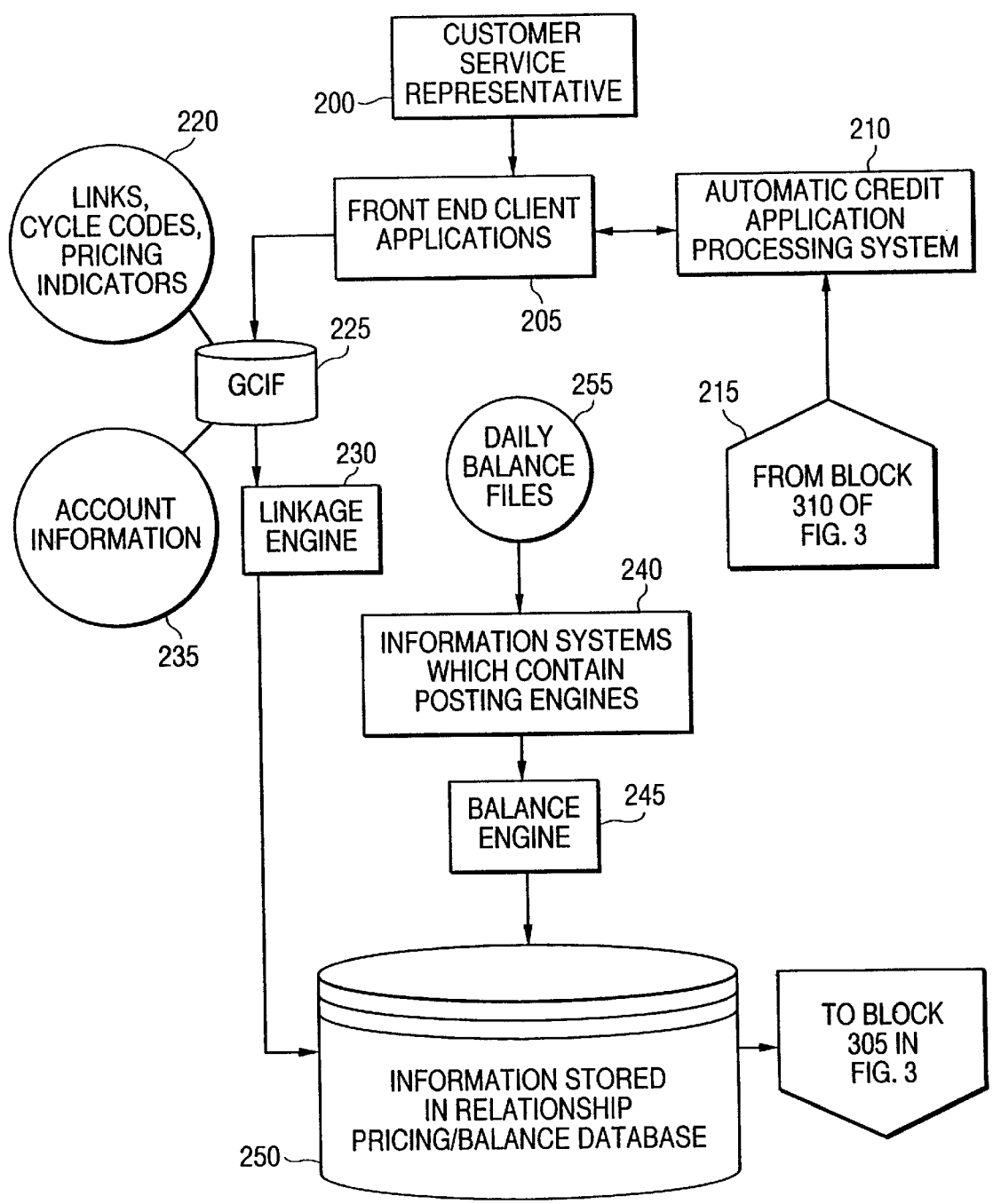
FIG. 2 is a portion of the system of the present invention.

FIGS. 2 to 10 present acts and structures comprising the method and apparatus of embodiments of the present invention. In FIG. 2, the relationship management system (RMS) 104, as shown in FIG. 1 of the present invention is accessed by Customer Service Representatives 200 through the WINDOWS™ based front end Client Applications 205. Household balances and specific rates are accessed through the Automatic Credit Application Processing system 210, which receives Tiers and Rates from the Pricing Engine 215 (Block 310 in FIG. 3). Links, Cycle Codes, and Pricing Indicators 220 are accessed through the GCIF 225, which gathers account information 235. Information is then sent through the Linkage Engine 230 to the Relationship Pricing/Balance Database 250. Daily balance files 255 are sent to the Balance Engine from the Instrument Systems 240, which contain Posting Engines. The information is sent through the Balance Engine 245 and stored in the Relationship Pricing/Balance Database 250.

Figure 3:
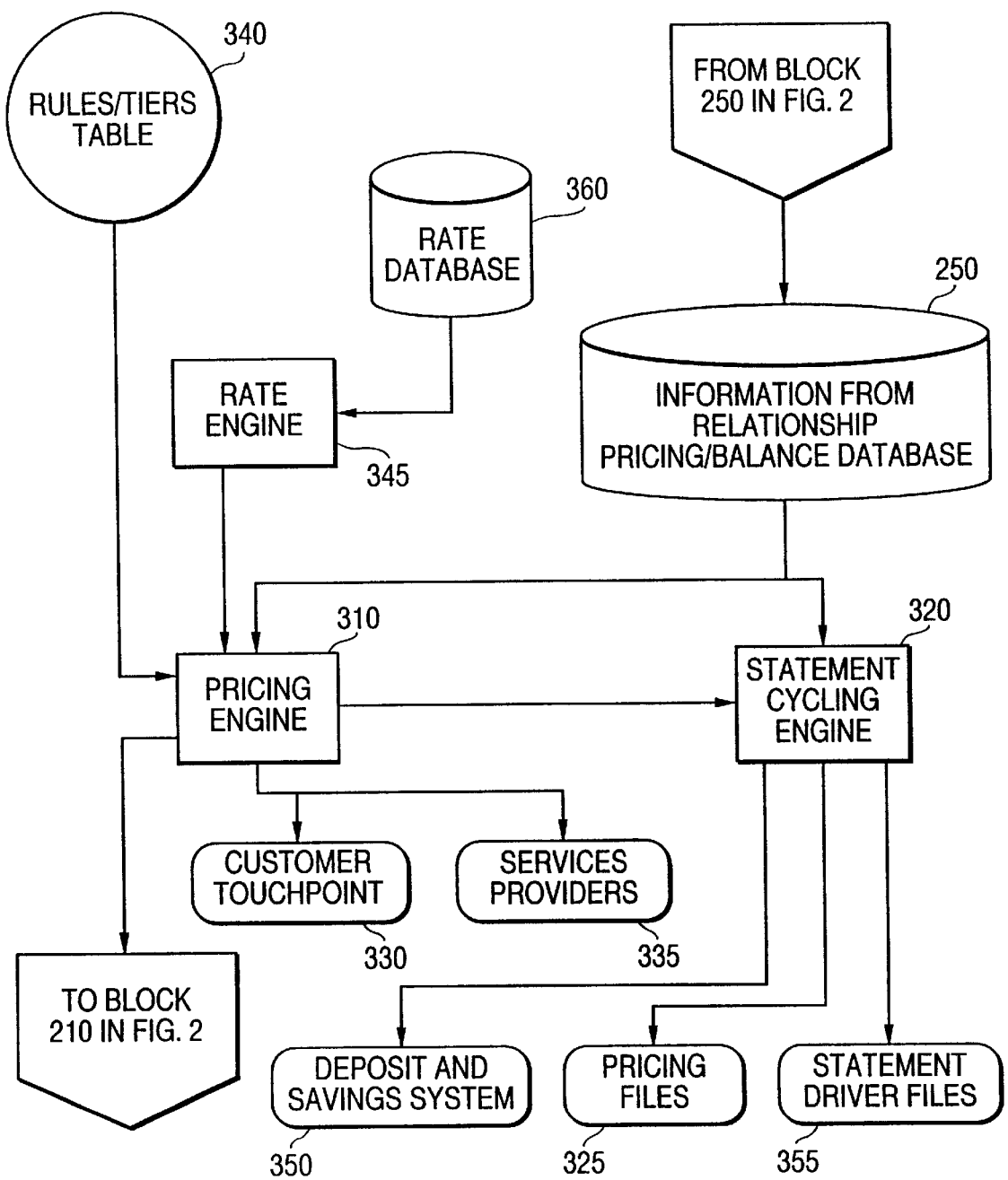
FIG. 3 is a another portion system of the present invention.

In FIG. 3, information from the Relationship Pricing Database 250, is passed to the Pricing Engine 310 to determine Tiers and Rates, and which also receives specific rate data stored in the Rate Database 260, from the Rate Engine 345 and data from the Rules/Tiers Table 340. The Pricing Engine sends Tiers and Household Balances to the Statement Cycling Engine. The Statement Cycling Engine 320 also receives daily Cycles from the Relationship Pricing/Balance Database 250. The Statement Cycling Engine 320 then sends components with pricing data and current balances to the Deposit and Savings System files 350, the Statement Driver Files 355 and Pricing/Balance Files 325. The Pricing/Balance Engine 310 also sends ready to use (RTU) rates to the Customer Touchpoint 330 and Services Providers 335.

Figure 4:
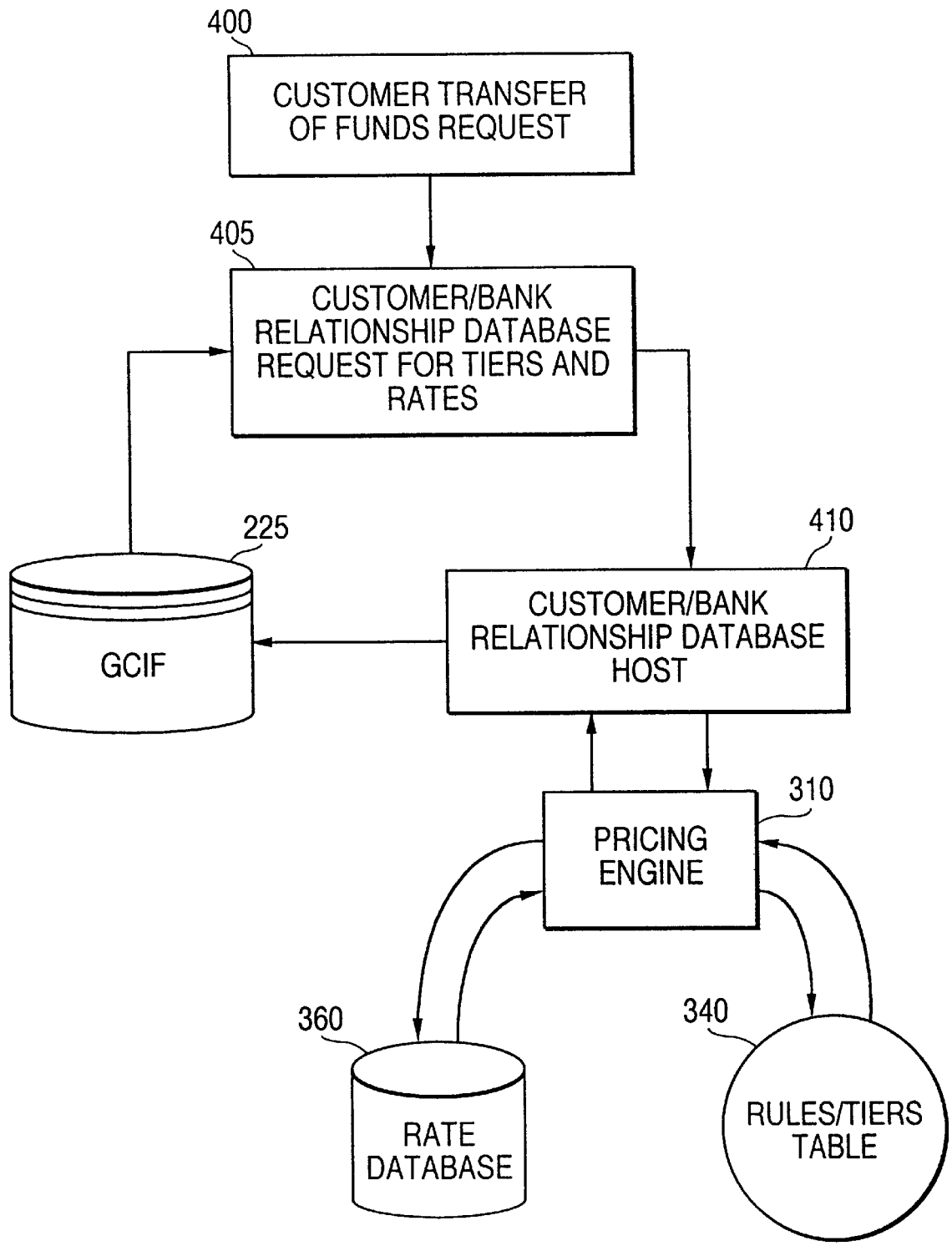
FIG. 4 is another portion of system of the present invention.
Figure 5:
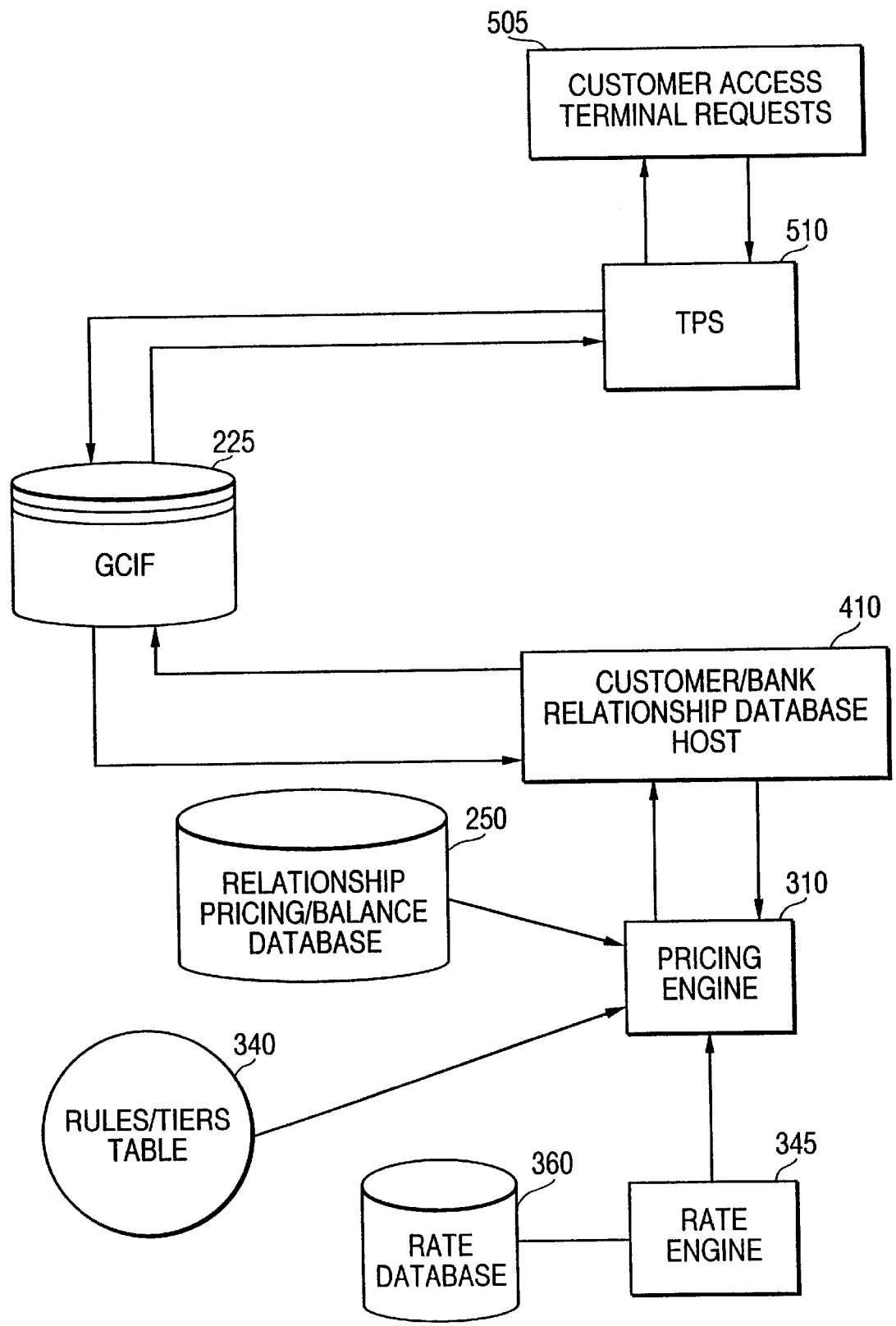
FIG. 5 is another portion system of the present invention.
Figure 6:
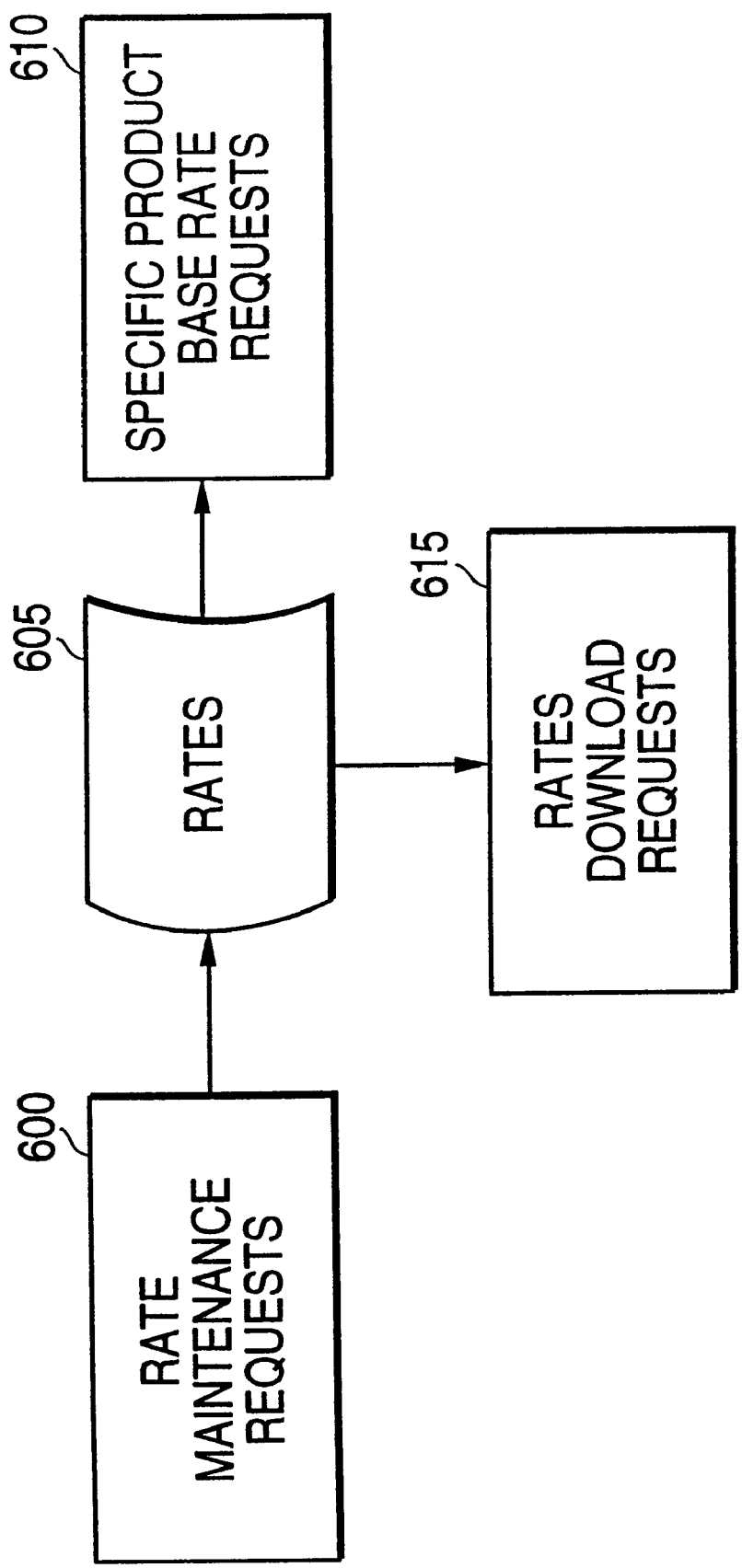
FIG. 6 is a schematic representation of the rate engine portion of the relationship management system of the present invention.

For the Rate Access process FIGS. 4 and 5, a Customer initiates a transfer of funds 400 and the Customer/Bank Relationship Database requests Tiers and Rates 405 through the Customer/Bank Relationship Database Host 410. The Pricing/Balance Engine 310 provides Rates and Tiers upon request from Customer/Bank Relationship Database Host 410 and the Tier Table 340 and Rate Database 360 provide input to Pricing/Balance Engine upon request. The GCIF 225 gets the data from the Customer/Bank Relationship Database Host 410 and returns Tiers and Rates from the GCIF Database 225. After a Customer initiates a transfer of funds, the Customer Access Terminal requests customer-specific rates from TPS 505. The Tier Table 340, Relationship Pricing/Balance Database 250 and Rate Database 360, via the Rate Engine 345, provide input to the Pricing Engine 310 and the Pricing Engine 310 provides Rates and Tiers upon request from the Customer/Bank Relationship Database Host. The Customer/Bank Relationship Database Host 410 provides data to the GCIF 225 and gets data from the GCIF Database 225 and provides Tiers and Rates upon request to Transaction Process System (TPS) 510, which returns the information to the Customer Access Terminal. The Rate Engine FIG. 6, services Rate Maintenance Requests 600 and provides Rates 605 to specific product base Rate requests 610 and Rates download requests 615.

Figure 7:
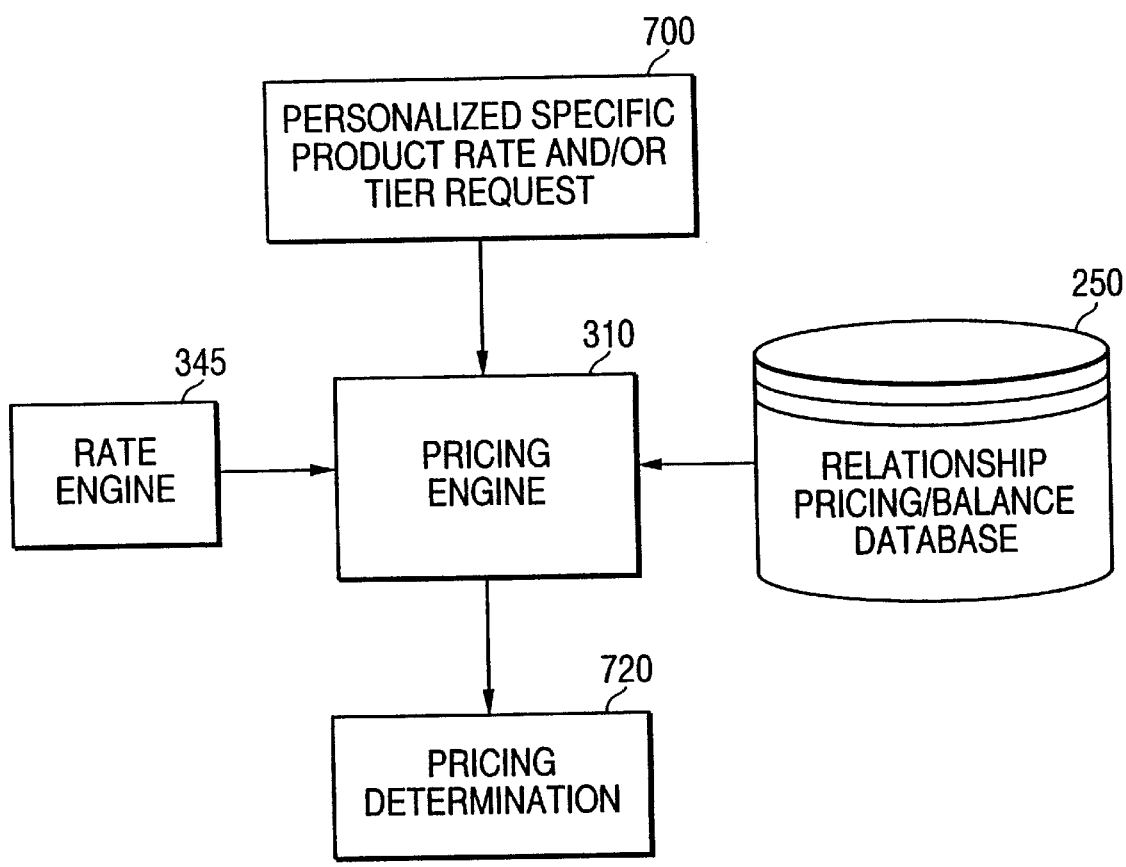
FIG. 7 is a schematic representation of the rate engine portion of the relationship management system of the present invention.

The Pricing Engine FIG. 7, receives requests for personalized specific Product Rate and/or Tier information 700. The Pricing Engine 310 requests Household Information, Package Level Pricing information, and other relevant information from the Relationship Pricing/Balance Database 250. The Rate Engine 345 provides the Pricing Engine 310 with the Base Rate for a specific product. The Pricing Engine then returns a Pricing/Balance Determination 720.

Figure 8:
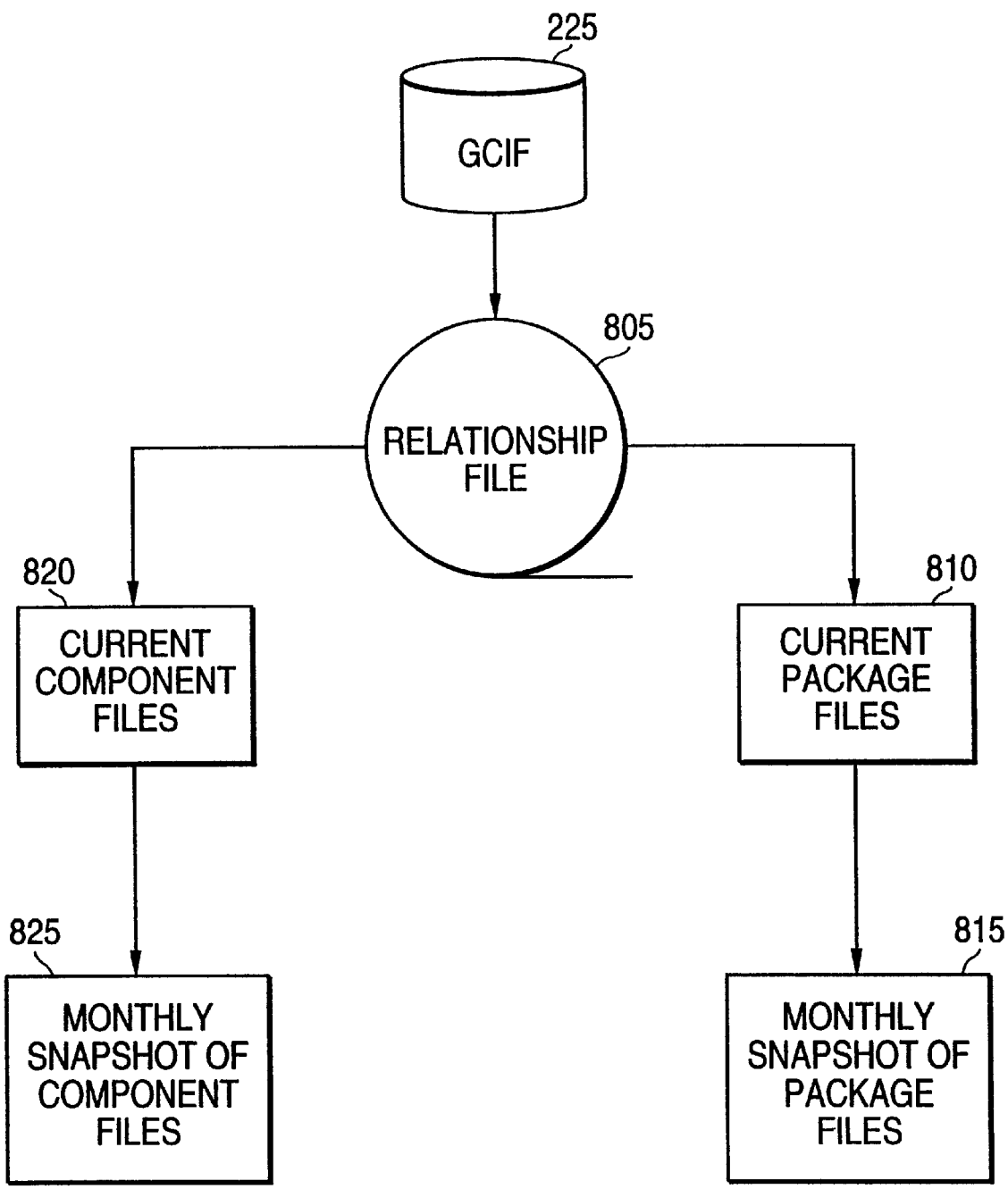
FIG. 8 is a schematic representation of the linkage engine portion of the relationship management system of the present invention.

The Linkage Engine FIG. 8, receives a daily feed from the GCIF 225 which is stored in the Relationship File 805. Current month Package Files 810 are updated daily with Linkage Data, and Pricing Data. Current month Component Files 820 are updated with Linkage Data and Pricing/Balance Data. At the end of the month, a snapshot of the Package Files 815 and Component Files 825 is made.

Figure 9:
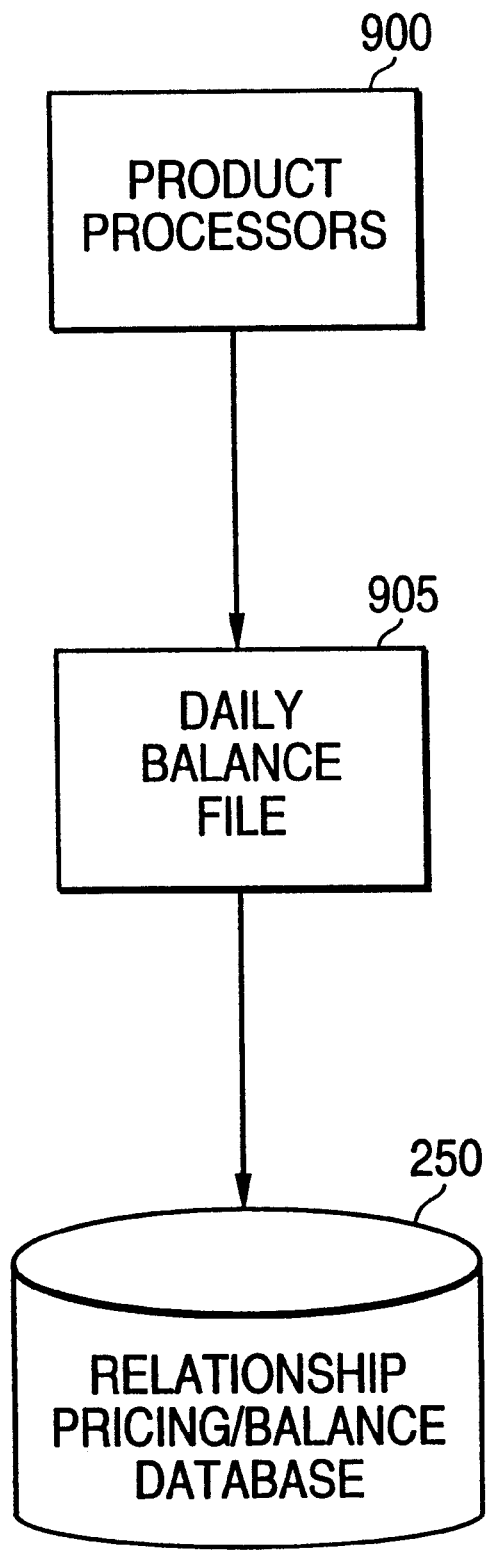
FIG. 9 is a schematic representation of the balance engine portion of the relationship management system of the present invention.

For the Balance Engine FIG. 9, the Instrument Systems, which contain Product Processors 900, pass component daily and aggregate balance to the Daily Balance File 905. The Daily Balance File 905 passes a current balance to the Relationship Pricing/Balance Database 250.

Figure 10:
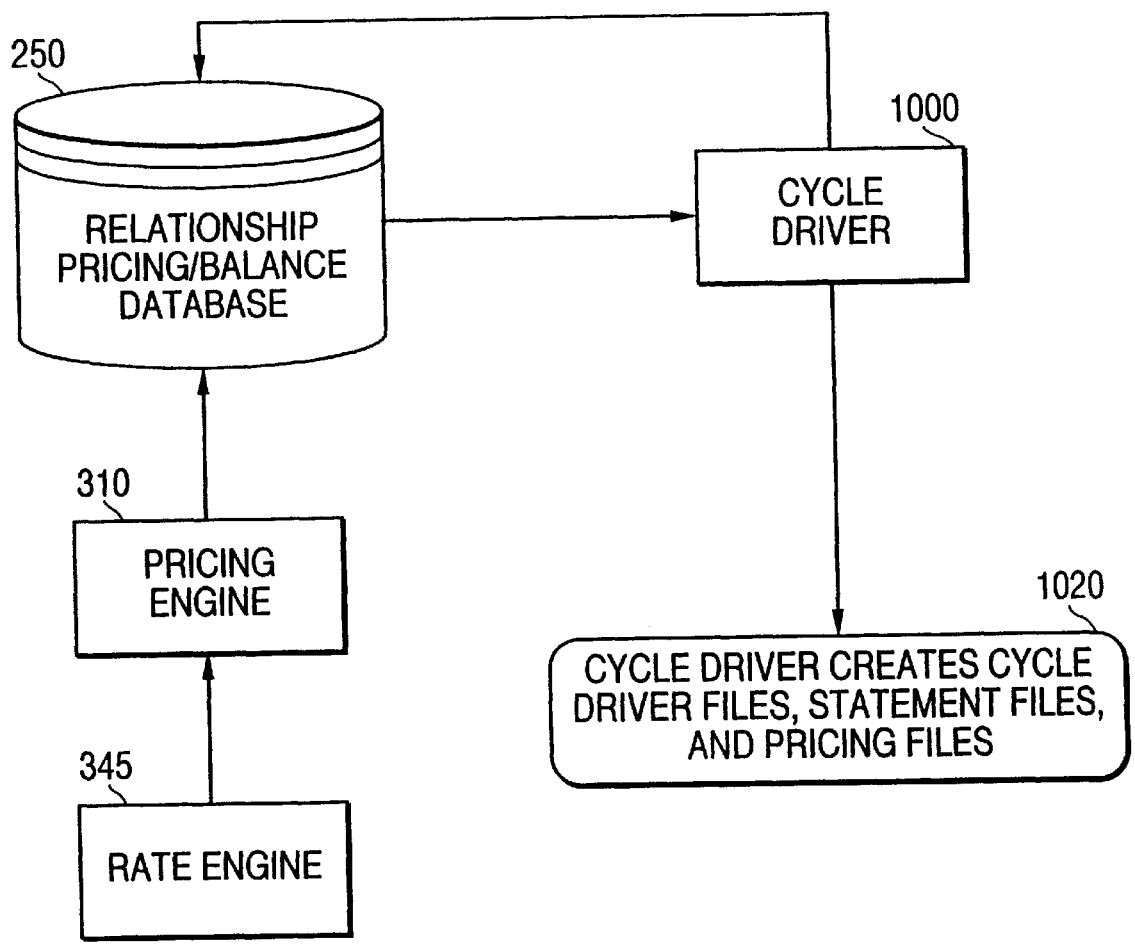
FIG. 10 is a schematic representation of the cycling engine portion of the relationship management system of the present invention.

For the Cycle Engine FIG. 10, the Cycle Driver 1000 requests and receives Package and Component Balance information from the Relationship Pricing/Balance Database 250. The Pricing Engine 310 obtains Base Rates from Rate Engine 345 and provides Household Balance, Tier, Fees, and Basis Point Spread to Relationship Pricing/Balance Database 250. The Cycle Driver creates Cycle Driver Files, Statement Files, and Pricing/Balance Files 1020.

What is claimed is:

1. An integrated financial system comprising:
    at least one account that includes a plurality of account components wherein each account component has a time of opening and a time of statement cycling and wherein each account component of the plurality of account components has an associated price based on a premium/discount interest rate and wherein the associated price is also based on a customer's relationship to a financial institution; and a relationship management system, the relationship management system including:

a general purpose programmable computer;

means for centralizing the capture, storage, and access to a plurality of interest rates corresponding to at least some of the account components;

means for generating a database of account component relationships;

means for generating balance files;

means for determining the associated pricing of individual account components in terms of premium/discount interest rates applicable to a first account component of the plurality of account components at the time of the first account component's opening and statement cycling based on the customer's relationship to the financial institution using the database of account component relationships and the balance files; and means for adjusting the associated pricing of individual account components.

2. The integrated financial system of claim 1 wherein the relationship management system further comprises cycling means for determining a list of account components for cycling on a given day and generating driver files to obtain account component information from at least one component product processor.

3. The integrated financial system of claim 1, wherein the customer's relationship to the financial institution includes account components of others within a household associated with the customer.

4. The integrated financial system of claim 1, wherein the at least one account includes a credit card component that is taken into account in determining the pricing of other account components.

5. The integrated financial system of claim 1, wherein the at least one account includes a secured credit component that is taken into account in determining the pricing of other account components.

6. The integrated financial system of claim 1, wherein the at least one account includes a money market component that is taken into account in determining the pricing of other account components.

7. The integrated financial system of claim 1, wherein the at least one account includes a retirement component that is taken into account in determining the pricing of other account components.

8. A method of determining prices associated with account components wherein the account components are grouped into accounts comprising:

centralizing the capture, storage, and access to a plurality of premium/discount interest rates corresponding to at least one account component;

automatically generating a database of account component relationships;

automatically generating balance files;

automatically determining the pricing of the at least one account component in terms of premium/discount interest rates applicable to the at least one account component based on the customer's relationship to the financial institution; and automatically adjusting the premium/discount interest rates applicable to the at least one account component.

9. The process of claim 8, further comprising determining a list of account components for cycling on a given day and generating driver files to obtain account component information from at least one component product processor.

10. The process of claim 8, further comprising:

utilization of account components of others within a household associated with the customer.

11. The process of claim 8, wherein one of the accounts includes a credit card component that is taken into account in determining the pricing of other account components.

12. The process of claim 8, wherein one of the accounts includes a secured credit component that is taken into account in determining the pricing of other account components.

13. The process of claim 8, wherein one of the accounts includes a money market component that is taken into account in determining the pricing of other account components.

14. The process of claim 8, wherein one of the accounts includes a retirement account component that is taken into account in determining the pricing of other account components.

15. The integrated financial system of claim 1 wherein one of the accounts includes at least one of the following account components: a checking component; a savings component and an investment component.

16. The process of claim 8 wherein one of the accounts includes at least one of the following account components: checking component; a savings component and an investment component.

17. The method of claim 8 wherein determining the pricing of the at least one account component occurs at the time of the at least one account component's opening and statement cycling.

18. A method for pricing financial instruments based on a customer's relationship to a financial institution, comprising:

initiating a pricing determination process for a customer, wherein the customer has at least one account with the financial institution;

determining links, cycle codes, and pricing indicators for the at least one account for the user;

transmitting links, cycle codes, and pricing indicators for the at least one account for the user to a linkage engine;

the linkage engine determining customer relationship information; transmitting the customer relationship information to a relationship pricing/balance database; transmitting balance data from a balance database to a balance engine;

the balance engine transferring and aggregating balance data; transmitting the transferred and aggregated balance data to the relationship pricing/balance database; transmitting the customer relationship information and the transferred and aggregated balance data from the relationship pricing/balance database to a pricing engine; transmitting rate information for the at least one account for the customer to a rate engine;

the rate engine making rate determinations; transmitting the rate determinations to the pricing engine;

the pricing engine returning a pricing determination based on a premium/discount interest rate and transmitting the pricing determination to a statement cycling engine and the statement cycling engine creating driver files, statement files, and pricing files and adjusting the pricing of the at least one account.

19. A computer system for pricing financial instruments based on a customer's relationship to a finical institution, comprising:
- a balance engine;
- a pricing engine;
- a linkage engine;
- a rate engine;
- a relationship pricing/balance database; and
- a Global Customer Information Facility (GCIF);
- wherein the balance engine receives balances of various accounts held by a customer and updates the balances stored within the relationship pricing/balance database;
- wherein the linkage engine forwards account information stored within the GCIF to the relationship pricing/balance database;
- wherein the rate engine forwards rates, rules and tiers from various tables to the pricing engine; and
- wherein the relationship pricing/balance database forwards data to the pricing engine and the pricing engine forwards the appropriate fees and interest rates to the financial institution so it is applied to the customer's individual accounts.

20. The computer system of claim 19 further comprising:
- a cycling engine wherein the cycling engine prepares written statements for the customer based on the information provided to it by the relationship pricing/balance database.

21. A method of determining a customer's price and interest rates of various accounts comprising:
- accessing a rate database which stores base interest rates for account components provided by a financial institution;
- updating a relationship pricing/balancing database to reflect changes in an account component balance;
- accessing a centralized database which stores information which is used to determine relationships between accounts;
- wherein a cycling engine detects changes made in the relationship pricing/balancing database on a periodic basis such that the rate database and centralized database are used to determine what pricing scheme a particular account component receives based on the customer's relationship with the financial institution; and
- using the determined pricing scheme to adjust an interest applied to the particular account component.

22. The method of claim 21 comprising the step of
organizing and maintaining the prices within the price table to reflect different prices for similar products held by different customers.

23. The method of claim 21 comprising the step of
organizing and maintaining the prices into a plurality of tiers.

24. The method of claim 21 comprising the step of using the customer's household relationship with the financial institution in order to determine the customer's prices and interest rates.

* * * * *